Oct. 14, 1969 E. WOLF ET AL 3,472,448

RECORDING SYSTEM FOR BUSINESS MACHINES

Filed Aug. 17, 1967 4 Sheets-Sheet 1

INVENTORS EDGAR WOLF
FRANCIS C. MARINO
HERMAN SIMON
DANIEL F. KUMMER

BY Yuter & Spiecens

ATTORNEY

Oct. 14, 1969 E. WOLF ET AL 3,472,448

RECORDING SYSTEM FOR BUSINESS MACHINES

Filed Aug. 17, 1967 4 Sheets-Sheet 3

RECORDING SYSTEM FOR BUSINESS MACHINES

Filed Aug. 17, 1967

United States Patent Office 3,472,448

Patented Oct. 14, 1969

3,472,448
RECORDING SYSTEM FOR BUSINESS MACHINES

Edgar Wolf, New Hyde Park, Francis C. Marino, Huntington, Herman Simon, Plainview, and Daniel F. Kummer, Port Jefferson Station, N.Y., assignors to Digitronics Corporation, Albertson, N.Y., a corporation of Delaware Continuation-in-part of application Ser. No. 620,040, Mar. 2, 1967. This application Aug. 17, 1967, Ser. No. 663,923

Int. Cl. G06c 13/00

U.S. Cl. 235—61 16 Claims

ABSTRACT OF THE DISCLOSURE

A data recording system for business machines having character and function keys for recording the character entries and the functions performed by the machine in a form presentable to a computer and the like. The system includes a sampling switch which is actuated to permit the recordation of a character only after the machine has been mechanically committed to enter the identical character to insure correspondence between the character entered in the machine and the record of such entry.

This application is a continuation-in-part of our copending application, Ser. No. 620,040, filed on Mar. 2, 1967, entitled "Recording System for Business Machines" now abandoned.

The present invention relates generally to recording systems and, more particularly, pertains to a recording system which is adapted to be used in conjunction with a business machine for recording, on an appropriate medium, the entries made in the machine.

Direct data communication betwen machines such as computers and the like is becoming more widespread as methods and facilities for accomplishing substantially error-free transmission of data is expanded. For example, the telephone companies presently provide facilities for transmission of data between machines over existing telephone lines. This service has been found to be particularly useful to those companies having, for example, a central office and a number of subsidiary or branch offices separated by relatively large distances. To be more specific, a computer may be located at the main or central office. Data, such as accounting data or the like, is transmitted to the central computer from the branch or subsidiary offices. This procedure results in a tremendous economic saving in the cost of equipment since only one centrally located computer is required rather than a plurality of computers, each one of which is located at a different branch office.

Presently, in order to take advantage of the communication system described above, conventional business machines such as adding machines, comptometers, and the like are being provided with recording systems for simultaneously converting and recording the information entered in such business machines into data signals which may be applied to a computer. Thus, the complete bookkeeping records of a branch office may be fed directly into a central computer so that the complete accounting picture of the entire organization may be had in a minimum period of time.

It will become obvious, from a consideration of the above-described example, that there must be a direct identity between each character entered in the business machine and the corresponding character recorded in the recording device. To put this in another way, if the character entered into the business machine represents the digit 3 and the corresponding character entered in the recording device represents a digit other than 3, a gross error will be introduced into the system. Hence it is of primary importance to assure a perfect one-to-one correspondence between machine and recording device entries.

Errors of the type referred to hereinabove may arise in any one of a number of different manners, such as by an incomplete keystroke on the part of the operator, or by a so-called dithering keystroke (i.e., a keystroke which includes some slight backward or irregular motion). An incomplete keystroke may commit the recording device to record the character; however, the stroke may be insufficient to commit the business machine to enter the character. Hence, a discrepancy will exist between the machine entry and the recorded entry. An irregular or dithering keystroke motion may cause the recording system to record a plurality of character entries while the business machine only registers a single entry.

Accordingly, an object of the present invention is to provide a recording system for business machines for recording the operations of the machine in data form which substantially eliminates any discrepancies between the machine entries and the recording device entries.

A more specific object of the present invention resides in the novel details of circuitry which provide a recording system which commits the recording device to record the entry of a character only after the machine has been mechanically committed to enter the corresponding or identical character, thereby to eliminate errors due to incomplete keystrokes.

A further object of the invention is to provide a recording system for a business machine which insures only one recorded entry for each mechanical commitment of the business machine, thereby to eliminate errors in the recordation of information due to irregular key motion.

Another object of the present invention is to provide a recording system of the type described which is compatible for use in conjunction with existing business machines so that such machines easily may be adapted to record entries in data form for application to computers or the like.

Still another object of the invention is to provide a recording system for a business machine which is economical to produce and reliable in operation.

A further error associated with recording systems of the type described arises when more than one key is operated on the same stroke. Thus, most business machines are provided with a mechanical interlock which is operable to prevent more than one key from actuating the mechanism during a keystroke. If two or more keys are operated simultaneously, the interlock may prevent any one key from being fully operated. However, if the magnitude of the blow is sufficiently large, the machine may be actuated to mechanically register a character. In this case, it is imperative that the recording system register the identical character to maintain correspondence between the machine and recording device entries.

Accordingly, a further object of the present invention is to provide a recording system for recording business machine entries in which direct correspondence is maintained between the record and machine entries albeit the machine is operated in response to a sharp blow rather than in response to the complete operation of any one key.

As noted hereinabove, the recording system of the present invention is adapted to be used in keystroke operated business machines having a plurality of selectively and individually operable character keys. Conventionally, as described in greater detail hereafter, machines of this type further include a movable carriage having a plurality of columns. Each column contains individual memory means for selected ones of the character keys which are movable from a rest position to an operated position in response to the operation of the associated character key. An indexing device, which similarly is responsive to the operation of any one of the character keys, is provided to advance the carriage one column. Machines of the type described are also provided with function keys which are operable to cause the machine to sense the operated memory means and to perform the selected function, such as addition, subtraction and the like.

In furtherance of the above objects, a recording system constructed in accordance with the present invention includes recording means for recording the operation of the character and function keys in response to a pulse applied thereto. In order to assure identity between the characters entered in the machine and the recording system the recording system further includes a pulse producing means for producing the pulse in response to the movement of the carriage of the machine. The pulse producing means is connected to the recording means through different character key switches which are individually operated by respective ones of the character keys. Thus, the carriage must physically move in order for a pulse to be applied to the recording means. This construction insures that no pulse will be applied to the recording means until the business machine has been mechanically committed to enter a character.

Other objects and advantages of the present invention will become more apparent from a consideration of the following detailed description when taken in conjunction with the accompanying drawings, in which.

As noted hereinabove, the recording system of the present invention is ideally suited for use in conjunction with any type of conventional keystroke operated business machine for recording the character entries and the functions performed by the machine during a cycle of operation. However, for purposes of illustration, the device of the present invention will be described in conjunction with the operation of an adding machine and, in particular, the Odhner Electric Adding Machine Model X–9, which is manufactured by the Aktiebolaget Original-Odhner, Goteborg, Sweden. The construction of this machine is representative of the construction of many keystroke business machines presently commercially available and only those portions of the machine which are pertinent to a clear understanding of the recording system of the present invention will be disclosed. If the reader wishes to obtain more information on this device other than what is described herein, he is referred to the publications of the Odhner Corporation, such as Service Manual MEK–12, and the catalogue of Spare Parts DEL A–12. It is emphasized that the adding machine referred to is for illustrative purposes only and is not to be interpreted as being a limitation on the present invention. That is, the recording system of the present invention may be utilized with any type of keystroke operated business machine which incorporates a movable carriage.

In order to facilitate an understanding and an appreciation of the recording system of the present invention, the operation of the adding machine is presented first. This is followed by a detailed description of the recording system per se.

Figure 1:
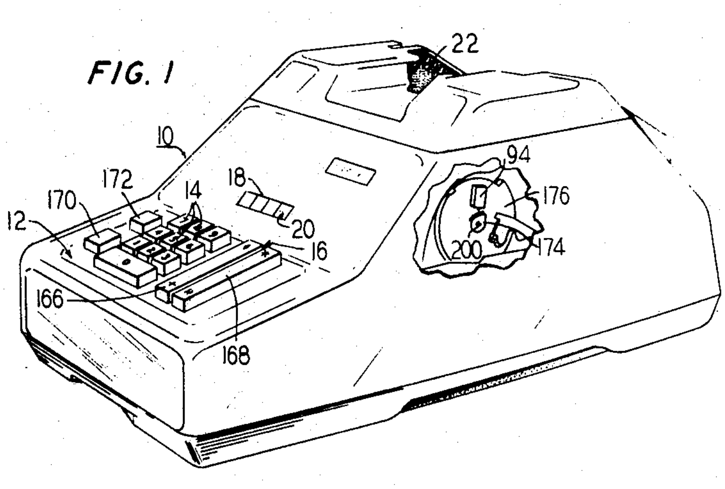
FIG. 1 is a perspective view of an adding machine utilizing the recording system of the present invention.

Accordingly, FIG. 1 illustrates an adding machine which is designated generally by the reference numeral 10, of the type which is adapted to be used in conjunction with the recording system of the present invention. The adding machine 10 includes a keyboard 12 having a plurality of character keys designated generally by the reference numeral 14 and a plurality of function keys designated by the reference numeral 16. As is conventional with machines of this type, there are ten character keys 24–42 (FIG. 2) which respectively represent the digits 1–0. The character keys 14 may be individually and selectively depressed to cause the corresponding selected digits to be entered in the machine. On the other hand, the function keys 16 may be individually and selectively depressed to cause the machine to perform specific functions such as add, subtract, or to produce a subtotal and the like, in a well-known manner. A window 18 (FIG. 1) is provided on the front panel of the machine and a column indicator 20 is visible through this window. The column indicator 20 is stepped into alignment with indicia 64 (FIG. 2), in the manner indicated below, to indicate which column the particular digit is being entered into (i.e., the unit column, the tens column, the hundreds column, etc.), Defined in the top surface of the machine 10 is an opening 22 through which a paper tape record (not shown) of the various entries introduced into the machine may exit. Accordingly, the operator of the machine thereby has an instantaneous record of the characters entered into the machine and the totals, subtotals, etc. of these characters as the case may be. Since the operation of the paper tape portion of the machine 10 is not pertinent to an understanding of the present invention, it will not be discussed herein.

Figure 2:
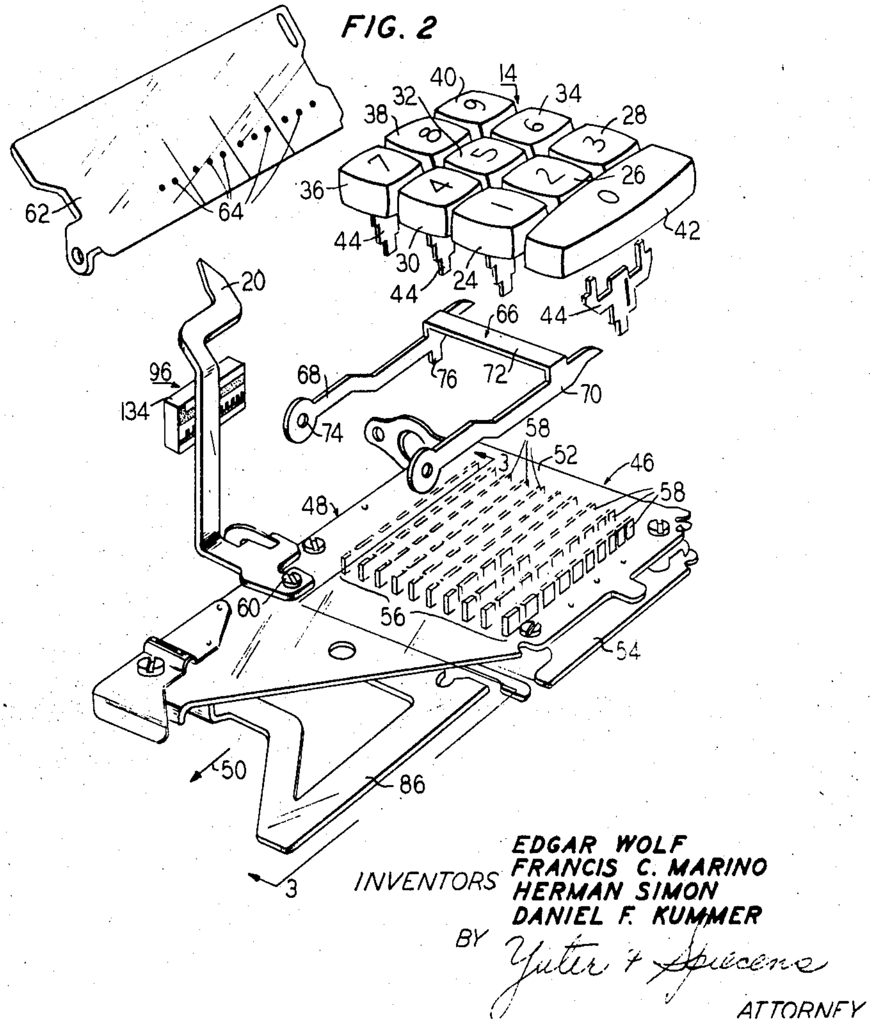
FIG. 2 is an exploded perspective view of a portion of the elements comprising the memory and indexing means of the machine shown in FIG. 1.

As shown more particularly in FIG. 2, the character keys 24–42 include finger pieces, each one of which has a different digit etched on the upper surface thereof corresponding to the digit represented by that individual key. For example, the finger piece of the key 24 bears the numeral or digit 1 thereon. Accordingly, the depression of this particular character key will cause the numeral 1 to be entered in the machine 10. Depending from each one of the character keys 14 is a leg member 44 which is connected, by an appropriate linkage mechanism (not shown), to a memory or registry device which is described in detail hereinbelow. Thus, when one of the character keys 24–42 is depressed, the digit represented by that particular character key will be entered into the memory device. When the addition function key is then operated, the number represented by the digits preserved in the memory device will be printed out on the paper tape in the conventional manner. Additionally, the number will be entered in a storage device (not shown) which accumulates the numbers entered into the machine and which prints out the accumulated sum of these numbers as total or subtotal function.

The memory or registering device is designated generally by the reference numeral 46 in FIG. 2 and includes a carriage 48 which is movable in the direction indicated by an arrowhead 50. The carriage 48 includes an upper plate 52 and a lower plate 54 which support a plurality of longitudinally spaced columns 56 of ten transversely spaced memory or register pins 58 which are adapted to be moved from a rest position to an operated position to register the entry of a character in the machine 10. The columns 56 correspond in number to the number of columns of digits which may be entered in the machine 10. For example, the left-hand column 56 corresponds to the first column of digits which are entered into the machine (i.e., the units column). On the other hand, the right-hand column 56 represents the last column of digits which would be entered in the machine 10.

The first nine memory pins 58 in any one of the columns 56 respectively correspond to the digits 0–8 represented by the respective character keys 42 and 24–38. In the particular example illustrated, there is no memory or register pin 58 which corresponds to the digit or numeral 9. Accordingly, the absence of an operated pin 58 in a column 56 will indicate the numeral 9 has been entered in the machine for that particular column, as noted in detail below.

The linkage mechanism which connects the character keys with the memory device 46 normally overlies the first column 56 (the left-hand column as taken in FIG. 2) which corresponds to the units column of digits. As each digit is entered into the machine 10 to produce a row of digits corresponding to the desired number the carriage 48 is stepped from one column to the next. That is, as a number is entered in one column 56, the carriage 48 is stepped so that the next column 56 underlies the linkage mechanism.

As indicated hereinabove, the particular column in which a digit is being entered is indicated by the column indicator 20, which is fixedly connected to the carriage 48 by a fastening means such as screw 60. A column indicating plate 62 is visible through the window 18 on the front surface of the machine 10 and it is provided with a plurality of dots or other indicia 64, as noted above, to indicate the particular column in which the digit is being entered. To be more specific, as shown in FIG. 2, ten dots 64 are provided on the plate 62 corresponding to the ten digits which may be entered in a row to represent a desired number. Thus, for example, if the indicator 20 is aligned with the third dot 64 from the right-hand edge of the plate 62, the operator will be notified that the digit which he is about to enter into the machine 10 by depressing one of the character keys 24–42 will be entered in the hundreds column of figures.

The indexing of the carriage 48 from one column to the next is controlled by means of a link designated generally by the reference numeral 66 in FIG. 2, in cooperation with the last or tenth memory pin 58 in each one of the columns 56. More specifically, the operating link 66 includes a rear member 68 and a forward member 70 which are interconnected by a bridge 72. The members 68 and 70 are pivotally mounted by appropriate pivot pins (not shown) which extend through aligned apertures 74 at the ends of the respective members. Depending from the rear member 68, and spaced from the ends thereof, is an operating cam 76. The cam 76 overlies and is adapted to engage and depress the last pin 58 in the column 56 in which the digit is being entered. It is to be understood that appropriate linkage mechanisms (not shown) are provided between the character keys 14 and the operating lever 66 such that the operating lever 66 will be pivoted to depress the last pin 58 each time one of the character keys 14 is operated.

Figure 3:
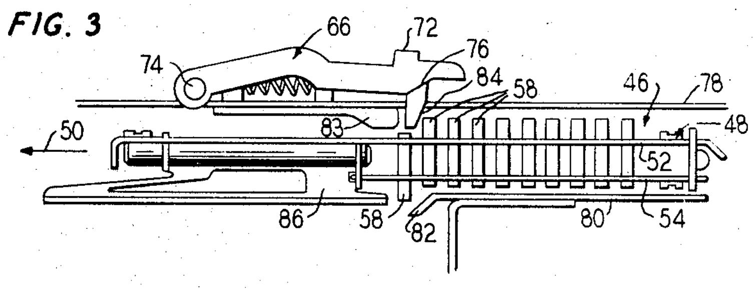
FIGS. 3 and 4 are front views of the indexing means as seen looking in the direction of lines 3—3 of FIG. 2, illustrating the sequential operation of the elements which control the movement of the carriage.
Figure 4:
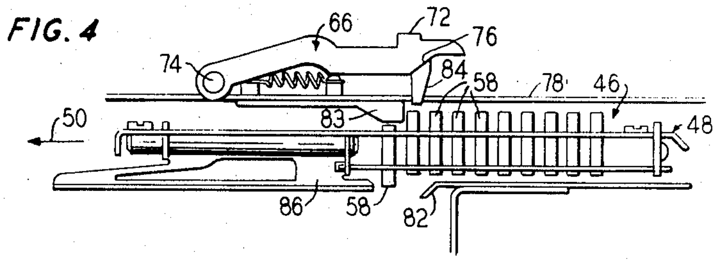

Referring now to FIGS. 3 and 4, there is shown the sequential operation of the elements which cause the carriage 48 to be stepped from column to column. Thus, the carriage 48 is normally received between an upper mounting plate 78 and a lower mounting plate 80, both of which are supported in the machine 10 by appropriate brackets (not shown). The lower plate 80 terminates in a downwardly outwardly inclined surface 82 which extends beyond the first column of pins 56 when the carriage 48 is in position to receive an entry in the first or units column. The surface 82 is adapted to engage and move the operated pins 58 back to the rest position when the carriage 48 moves back to the start position during a function cycle.

Depending from the upper mounting plate 78 and spaced beyond the operating cam 76 in the direction of travel of the carriage 48 (indicated by the arrowhead 50) is a stop 83 which is located directly in the path of travel of the last or tenth row of pins 58. Accordingly, when the carriage 48 is in the normal start or first column position, the first pin 58 abuts or is engaged with the stop 83. Moreover, the pointer 20 will be aligned with the first indicia element 64. When any one of the character keys 24–42 is depressed to enter a character or digit in the memory device 46, the operating lever 66 will be pivoted downwardly, as shown in FIG. 3, so that the lower edge of the operating cam 76 engages and depresses the last pin 58 in the first column 56 to an operated position. In this aforementioned operated position, the depressed pin 58 will be spaced below the lower surface of the stop 83 so that the pin 58 will no longer engage or be engaged by the stop 83. The carriage 48 will then advance in the direction indicated by the arrowhead 50 under the influence of an appropriate biasing device (not shown) such as a spring or the like, until the next pin 58 engages an inclined cam surface 84 on the depressed operating cam 76. At this point, the carriage 48 will have moved to an intermediate position (i.e., intermediate between two adjacent columns) and the pointer 20 will be located between the two corresponding adjacent dots or indicia 64 to notify the operator that the carriage 48 is in the so-called intermediate position.

When the operated one of the character keys 24–42 is released, the operating lever 66 pivots back to its original position, as shown in FIG. 4, under appropriate biasing means (not shown) so that the cam surface 84 rides up on the abutting register pin 58. As soon as the operating cam 76 has risen above the top surface of the aforementioned abutting memory or register pin 58, the carriage 48 will be free to move in the direction indicated by the arrowhead 50 until the second pin 58 now engages the stop 83, as shown in FIG. 4. Accordingly, for this arrangement of the elements, the carriage 48 will have been advanced one full column, so that the pointer 20 will now point to the second indicia means 64 from the right-hand edge of the plate 62 to indicate that the machine 10 is now ready to accept the digit which is to be entered in the second column of figures.

Summarizing the indexing operation of the machine 10, the depression of any one of the character keys will cause the carriage 48 to advance to an intermediate position. In other words, the carriage 48 will advance a distance less than the spacing between adjacent columns 56. When the operated character key is released, the carriage 48 will advance a distance which will bring the next column 56 beneath the linkage mechanism associated with the character keys so that the next depression of any one of the character keys 24–42 will cause the appropriate digit to be entered in this next column.

The entry of any one of the digits 0–8 in the memory device 46 is accomplished in a manner similar to that described above. That is, when one of the character keys 24–38 or 42 is depressed, the register pin 58 corresponding to that digit will be moved from its upper normal or rest position to its lower operated position simultaneously with the advance of the carriage from one column to the next. (The entry of the digit 9 is represented by the absence of an operated memory pin 58 in a column 56, as noted in detail below.)

In the illustrative business machine under consideration, mechanical interlock means is provided to prevent the entry of more than one digit in a particular column. The interlock is designated generally by the reference numeral 71 in FIG. 5 and comprises a track 73 having a plurality of spacers 75 therein. A plurality of fingers 77 are provided which are individually aligned with the space between respective adjacent ones of the spacers 75. The fingers 77 are normally in spaced relation to the spacers 75.

Each one of the fingers 77 is connected to a different one of the character keys 24–42 by an appropriate link (not shown). When a character key is depressed, the finger 77 connected thereto will move forward relative to the spacers 75 and extend between two adjacent spacers. The track 73 and the spacers 75 are sized so that the distance between all the spacers and the ends of the track is substantially equal to the width of a single finger 77. Accordingly, when one finger 77 is received between a pair of spacers 75, the spacers will be forced against each other and the end spacers 75 will be forced against the ends of the track. Since each spacer 75 is in engagement with the next adjacent spacer, the possibility of any one of the other fingers 77 moving therebetween will be eliminated. Hence, the interlock 71, in effect, prevents the depression of more than one of the character keys 24–42 at any one time. Moreover, because the memory device 46 is advanced one column each time a character key is depressed, it will be obvious that the interlock 71 is operable to prevent the entry of more than one digit in a column.

When one of the function keys 16, such as the add key, is operated, a plurality of sensing fingers (not shown) are caused to move transversely with respect to the carriage 48. The sensing fingers are adapted to engage the respective operated memory or register pins 58. The length of movement of the sensing fingers accordingly will be dependent upon which pins are operated in the respective columns 56. Depending upon the length of movement of the sensing fingers, the fingers will cause the machine to print out the digits which have been entered into the memory device 46. Additionally, the memory store of the machine 10 will update the data stored therein in accordance with the digits entered in the memory device 46.

To be more specific, if it is assumed that the digits 1 and 0 have been entered for the first two columns of digits, the second pin 58 in the first column 56 and the first pin 58 in the second column 56 will have been moved to the operated position while the carriage 48 will have advanced to the third column position, so that the pointer 20 will be aligned with the third dot 64. If the function key 16 representing the add function of the machine is now depressed, the sensing fingers will move transversely with respect to the carriage 48 so that one sensing finger will engage the second pin in the first column 56 of memory pins 58 and a second sensing finger will engage the first pin in the second column 56 of memory pins 58. Thus, the numeral ten will be entered on the paper tape and in the memory store of the machine 10 the conventional manner.

A stop bar 86 (FIG. 2) is provided which is connected to and movable with the carriage 48. The stop bar 86 is adapted to engage and prevent movement of the sensing or totalizing fingers corresponding to those columns for which no data has been entered. As an example, no data will be entered in the columns 3–10 when a number is entered into the first two columns 56 of the memory device 46. Accordingly, the sensing fingers for sensing the operated pins 58 in the columns 3–10 will engage the stop bar 86 and will not move. Hence, no data will be entered for these columns, and these columns will remain blank.

As noted hereinabove, in the particular adding machine described herein, the digit 9 is represented by the absence of an operated memory register pin 58 in a column 56 through which the carriage 48 has advanced. In other words, when the character key 40 representing the digit 9 is depressed, the carriage 48 will advance one column. However, none of the memory pins 58 will be moved to the operated position other than the last memory pin 58 which is utilized to index the carriage from column to column. Accordingly, when the totalizing finger traverses a column 56 in which the digit 9 was entered, the totalizing finger will not encounter any one of the first nine memory pins 58. Thus, the absence of an operated memory pin 58 among any one of these first nine memory pins 58 in a column 56 through which the carriage 48 has been advanced, will represent the entry of the digit 9 in this column.

It should be noted also that if two or more character keys are depressed simultaneously neither key will be able to operate a memory or register pin 58 because the mechanical interlock 71 will prevent the full depression of the keys in the manner noted above. However, if the magnitude of the blow is sufficiently large, the operating lever 66 may be actuated to cause the carriage to be indexed one column. Hence, when an add cycle is initiated in the machine, the sensing or totalizing finger traversing this column will sense that none of the first nine memory pins 58 have been moved to the operated position and, accordingly, the digit 9 will be entered into the machine. This particular feature is inherent in the machine described herein.

Having now described the features of the adding machine 10 which are pertinent to the character recording portion of the system of the present invention, the system will now be described in detail, reference being had to the description set forth hereinabove to clarify the operation of a sampling switch incorporated in the recording system. The function cycle of the machine 10 will be described below in conjunction with the recordation of the functions performed by the machine.

In general, the recording system includes a plurality of switches which are individually and selectively operable by respective ones of the character keys to connect a pulse source with a recording medium through an appropriate encoder. In order to avoid the recordation of a character due to an incomplete keystroke (i.e., an operation in which one of the character keys is not fully depressed so the digit is not entered in the memory device 46) a sampling switch is serially connected between the pulse source and the encoding and recording mechanism. The sampling switch is adapted to be closed only after the machine 10 has been committed to make an entry in the memory device 46, thereby to insure correspondence between the machine entry and the recording entry.

Additionally, the pulse source includes a device which is adapted to produce a single pulse only after the machine 10 has been mechanically committed to enter a digit. Thus, irregular key movement which may cause the associated switch to open and close a number of times will not produce corresponding erroneous entries in the recording mechanism.

Figures 5, 6:
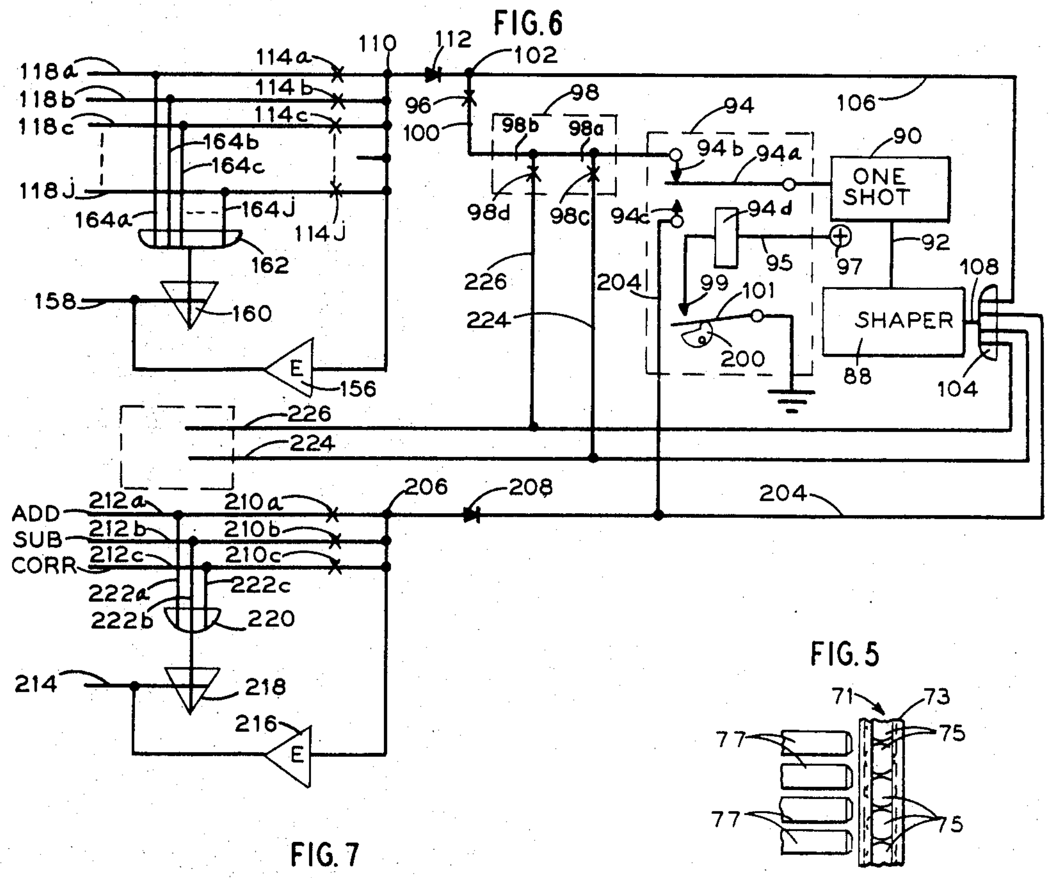
FIG. 5 is a top plan view of the interlock mechanism, with parts broken away.
FIGS. 6 and 7 are schematic circuit wiring diagrams, partially in block form, of the recording system of the present invention.
Figure 7:
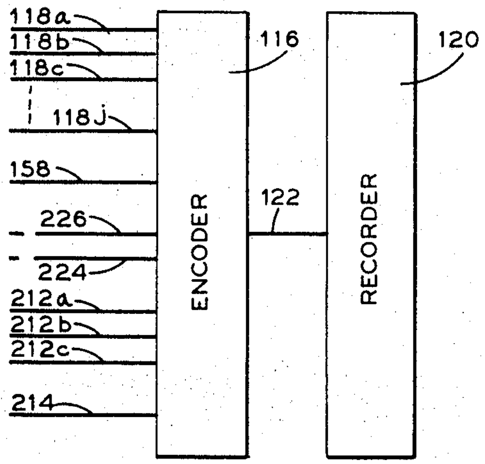

More specifically, a schematic circuit wiring diagram of the recording system of the present invention is shown in FIGS. 6 and 7 and comprises a pulse shaping network 88, the output terminals of which are connected to a monostable multivibrator 90 by a lead 92. The output terminals of the monostable multivibrator or one-shot device 90 are connected to the armature 94*a* of a time delay relay of function cycle switch 94. The armature 94*a* is normally connected to a contact 94*b* of the relay 94. However, when a function operation is initiated in the machine 10, the winding 94*d* of the relay is energized in the manner indicated below to move the armature into engagement with a contact 94*c*. The contact 94*b* is connected to one side of a normally open sampling switch 96 through the normally closed contacts 98*a* and 98*b* of an auxiliary switch 98 by a lead 100. The other side of the sampling switch 96 is connected to a junction point 102.

The junction point 102 is connected to one input terminal of a conventional OR or buffer gate 104 by a lead 106. The output terminals of the OR gate 104 are connected to the input terminals of the pulse shaping network 88 by a lead 108. The OR gate 104 is conventional in conseruction and is adapted to produce an output signal when an input signal is applied to any one of its input terminals. The junction 102 is also connected to a junction 110 through an isolating diode 112. The diode 112 is polarized so that the anode electrode is connected to the junction 110 and the cathode electrode is connected to the junction 102.

The junction 110 is connected to one side of a plurality of normally open switches 114*a*–114*j* (there is no switch 114*i*) which are selectively and individually operable by the respective character keys 24–38 and 42. It is to be noted that no switch is provided for the character key 40 which represents the digit 9. The other side of the switches 114*a*–114*j* are connected to an encoder 116 (FIG. 7) by respective leads 118*a*–118*j*. The output terminals of the encoder are connected to the input terminals of a recorder 120 by a lead 122.

The recorder 120 may preferably take the form of a tape deck which records electronic signals in a form presentable for application to a computer input. The encoder 116 is adapted to produce different output signals in accordance with which one of the leads 118*a*–118*j* is energized. For example, if the lead 118*a* is energized in the manner indicated below, signifying that the one character key 24 has been depressed, the encoder 116 will produce an appropriate signal corresponding to the digit one and present these signals to the recorder 120. An encoder and a recorder of the type contemplated are disclosed in copending application Ser. No. 454,473, filed May 10, 1965, entitled "Data Transmission Apparatus and Methods," now U.S. Patent No. 3,401,396.

Figure 9:
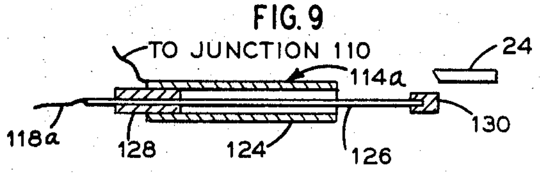
FIG. 9 is a vertical sectional view of a key switch.

In practice, the switches 114*a*–114*j* are of the coaxial type and are positioned on the machine 10 directly below the finger pieces of the respective character keys 24–38 and 42. More specifically, the key switch 114*a*, which is representative of the plurality of coaxial key switches, is shown in FIG. 9 and comprises a conducting outer sleeve 124 and a flexible and resilient coaxial inner conductor 126 which is maintained in spaced relationship to the sleeve 124 by an insulating member 128 connected to the rear end of the conductor 126. The conductor 126 projects beyond the front end of the sleeve 124 and receives an insulating member 130 on the end thereof. The end of the conductor 126 carrying the insulating member 130 is positioned below the finger piece of the key 24 so that when the key 24 is depressed, the finger piece engages and flexes the inner conductor 126 so that the conductor 126 contacts the outer sleeve 124 to close the key switch. The outer sleeve 124 is connected to the junction 110 and the inner conductor 126 is connected to the encoder 116 via the lead 118*a*. Accordingly, when the switch 114*a* is closed, the junction 110 will be connected to the encoder 116. When a pulse appears on the lead 118*a*, the encoder will be actuated to produce a signal representative of the digit one.

Figure 8:
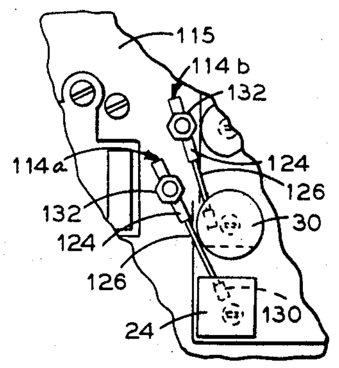
FIG. 8 is a fragmentary top plan view of the keyboard of the machine shown in FIG. 1, illustrating the relationship between the character keys and the character key switches.

As shown in FIG. 8, the key switches such as key switches 114*a* and 114*d* are maintained in place on a support plate 115 by screws 132. The inner conductors 126 are positioned below the respective finger pieces of the associated keys, as set forth in the preceding paragraph. The key switches associated with the remaining character keys are similarly positioned with respect to their associated key.

Figure 10:
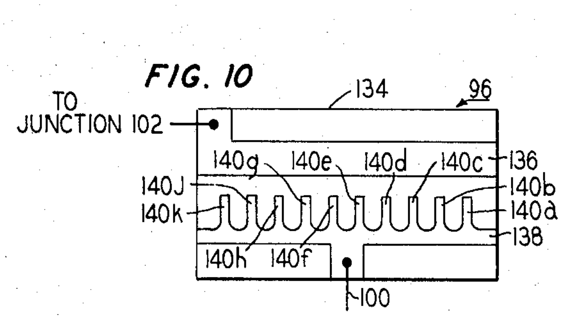
FIG. 10 is a front elevational view of the contact portion of the sampling switch of the recording system of the present invention.
Figure 11:
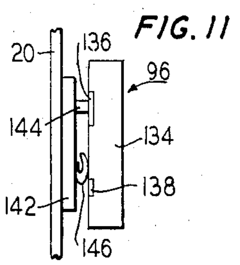
FIG. 11 is a side elevational view of the contact portion and brush portion of the sampling switch indicated schematically in FIG. 6.

The sampling switch 96 is shown in FIGS. 2, 10 and 11 and comprises an insulating block 134 which is mounted on the machine 10 by appropriate means (not shown) and positioned adjacent the movable column indicator 20. An upper continuous conducting bar 136 is positioned on the front surface of the block 134 and is connected to the junction 102. A lower conducting member 138 is positioned on the front surface of the block 134 and comprises ten upstanding interconnected conducting fingers 140*a*–140*k* (there is no finger 140i) corresponding to the ten columns of digits. The member 138 is connected to the auxiliary switch 98 by the lead 100. Mounted on the column indicator 20 by a sheet of insulating material 142 is an upper brush 144, which is adapted to engage the upper conducting bar 136, and a lower brush 146 which is adapted to sequentially engage the conducting fingers 140*a*–140*k* as the column indicator 120 is stepped from one column position to the next column position. The brushes 144 and 146 are connected together so that a complete circuit will exist between the auxiliary switch 98 and the junction 102 when the brush 146 engages any one of the conducting fingers 140*a*–140*k*.

It is specifically emphasized that the conducting fingers 140*a*–140*k* are positioned so that they will be engaged by the brush 146 only when the carriage 48 is in the intermediate position mentioned hereinabove. In other words, the sampling switch 96 will be closed only when the carriage 48 has been moved to a position intermediate the column positions. To put this another way, the sampling switch 96 will be closed only after the machine 10 has been mechanically committed to enter a particular digit because this is the only time the carriage 48 will move to the intermediate position.

In describing the operation of the recording system thus far disclosed, it will be assumed that the character key 24 has been depressed to enter the digit 1 in the adding machine. Accordingly, the initial downward movement of the character key 24 will actuate the mechanical interlock 71 in the manner noted hereinabove, to prevent the depression of any one of the other keys. The continued downward movement of the character key 24 will cause the inner conductor 126 of the key switch 114*a* associated with the character key 24 to close thereby completing the circuit from the junction 110 to the encoder 116. Moreover, the switch 114*a* will remain closed until the key 24 moves back to its normal position. The continued downward movement of the key 24 will cause the second memory pin 58 in the particular column 56 in which the digit 1 is to be entered to be moved to the operated position. Simultaneously, the carriage 48 will be stepped to the intermediate position in the manner described in detail hereinabove, and illustrated in FIGS. 3 and 4.

As the carriage 48 moves to the intermediate position the lower brush 146 engages the respective one of the conducting fingers 140*a*–140*k* in accordance with the location of the column indicator 20. The sampling switch 96 is thereby closed to connect the output of the multivibrator 90 with the input of the pulse shaping network 88 through the function cycle switch 94, the auxiliary switch 98, the leads 100 and 106, the OR gate 104 and the lead 108. The pulse shaping network 88 produces a pulse which causes the one-shot or monostable multivibrator 90 to produce a negative-going pulse. The pulse shaping network 88 is utilized to delay the time of occurrence of the pulse produced by the multivibrator 90 to insure that all contact bounce has ceased at the time the multivibrator 90 produces the pulse. The multivibrator pulse, which, in practice, is approximately 3 milliseconds in duration, is applied through the isolation diode 112 and the now closed key switch 114*a* to the encoder 116 via the lead 118*a*. Accordingly, the encoder 116 will produce and apply a signal representative of the entry of the digit 1 in the machine 10 to the recorder 120 via the lead 122.

When the character key 24 is released, the switch 114*a* opens and the carriage 48 is stepped to the next column position, in the manner noted hereinabove, in preparation for a subsequent entry. Thus, the brush 146 moves longitudinally relative to the conducting fingers 140*a*–140*k* from the conducting finger previously engaged to a point intermediate the conducting fingers thereby opening the sampling switch 96 and breaking the circuit. Accordingly, since the connection is now disrupted from the output of the monostable multivibrator 90 to the input of the pulse shaping network 88, these elements are allowed to recover for the generation of a subsequent single-pulse in response to the entry of another character into the machine 10.

Figure 12:
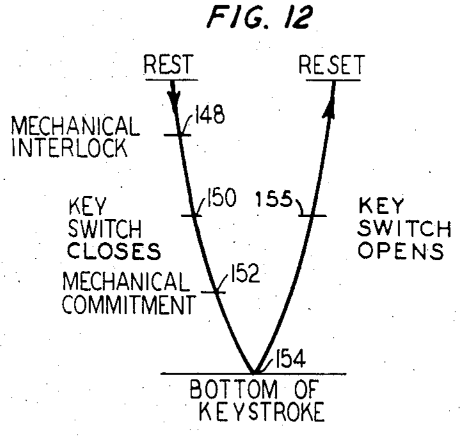
FIG. 12 is a graph showing the operating points of the machine as a function of key travel.

FIG. 12 is a graphic illustration of the operation performed by a character key as a function of its travel. Thus, initially, the character key is at rest. However, as the character key is depressed it first passes the mechanical interlock point 148, which initiates the operation of the mechanical interlock 71 so that no other key may be depressed to cause a digit to be entered in the machine at this time. Further downward travel of the key causes the key to pass the key switch operation point 150 thereby causing the associated key switch to close. Finally, the continued depression of the key causes the key to pass the mechanical commitment point 152 at which time the appropriate digit is entered into the memory device 46 of the machine 10 and the machine is stepped to the intermediate position thereby closing the sampling switch 96 to initiate the recording of the digit in the recorder 120. When the key reaches the bottom 154 of the keystroke it is released and allowed to return to the reset position by means of an appropriate biasing device such as a spring, thereby permitting the carriage to advance a full column position. The key switch will open when the key passes point 155 during its movement toward the reset position.

Accordingly, it will be noted that the only time that an entry will be made in the recorder 120 is after the machine has been mechanically committed to enter a corresponding digit. To put this another way, if the character key is released before it reaches the mechanical commitment point 152, the carriage 48 will not move and, consequently, the sampling switch 96 will remain open. Hence, a direct correspondence between the digits entered in the machine 10 and the digits recorded in the recorder 120 will always be maintained. Additionally, since a monostable multivibrator 90 is utilized, only one pulse will be produced each time the carriage is stepped from column to column. Hence, only one digit entry will be recorded for each mechanical entry of the machine irrespective of irregularities in the keystroke of any particular character key.

As noted hereinabove, in the adding machine 10 under consideration, the digit or numeral 9 is represented by the absence of an operated memory pin 58 in a column 56 through which the carriage 48 has been stepped. Accordingly, if the carriage 48 is stepped a column and no pin 58 is moved to the operated position in this column, as when the machine 10 is struck a sharp blow, the sensing fingers will interpret this action as the entry of the numeral 9 in that column, as noted in detail above. It is therefore desirable that the digit 9 similarly be entered in the recorder 120 to maintain correspondence between machine and recorder entries. In order to insure such agreement, the recording system of the present invention further includes an emitter follower 156, the input of which is connected to the junction 110. The output of the emitter follower 156 is connected to the encoder 116 by a lead 158. Similarly to the leads 118*a*–118*j*, when a negative going pulse appears on the lead 158 the encoder 116 will be actuated to produce an output signal representative of the digit 9. Additionally, the lead 158 is connected to the output terminals of an inverting amplifier 160. The input terminals of the amplifier 160 are connected to the output terminals of a conventional OR or buffer gate 162. The input terminals of the OR gate 162 are connected to the respective leads 118*a*–118*j* by corresponding leads 164*a*–164*j*.

In practice, the inverting amplifier 160 is normally cut-off, thereby tending to place a negative potential on the lead 158. However, the lead 158 is normally maintained at 0 potential due to the conducting emitter follower 156. When one of the character keys 14 representing the digits 0–8 is depressed, the sampling switch 96 will close in the manner described hereinabove to cause a negative-going pulse to be applied to the junction 110 through the isolation diode 112. As a consequence, the emitter follower 156 which is connected to the junction 110 will be cut-off. However, because of the particular input design of the inverting amplifier 160, which is conventional, the amplifier will begin to conduct at the time when one of the key switches 114*a*–114*j* is closed and before the sampling switch 96 closes. Accordingly, the lead 158 will be maintained at zero potential by means of the now conducting inverting amplifier 160.

On the other hand, when the character key 40 is depressed representing the entry of the digit 9 in the machine 10, the emitter follower is again cut-off during the interval that the negative-going pulse is applied from the multivibrator 90. However, no pulse will be applied to the input terminals of the inverting amplifier 160 and accordingly the inverting amplifier will remain cut-off. Thus, the output level on the lead 158 will be transferred from zero potential to a negative potential during the period of cut-off of the emitter follower 156.

The appearance of the negative going pulse on the lead 158 will cause the encoder to generate a signal representative of the digit 9 and to apply the same to the recorder 120.

As set forth hereinabove, the machine 10 also includes function keys (FIG. 1) such as an add key 166, a subtract and totalizer key 168, a correction key 170 and a non-add key 172. When any one of these keys is depressed, the machine performs the function called for by the depressed key. For example, if the add key 166 is depressed, the machine will add the number entered in the memory device 46 of the machine to the memory store of the machine. If the subtract and totalizer key 168 is then depressed, the machine will be actuated to print out the sum of all of the numbers which have been entered in the machine up to that point on the paper tape. The tape is then fed out of the opening 22 on the top surface of the machine.

When any one of the function keys 166–172 is depressed or operated to cause the machine 10 to initiate a function cycle, a drive shaft is caused to rotate, which operates the print wheels (not shown) of the machine to print a number on the paper tape and to advance the paper tape.

Figure 13:
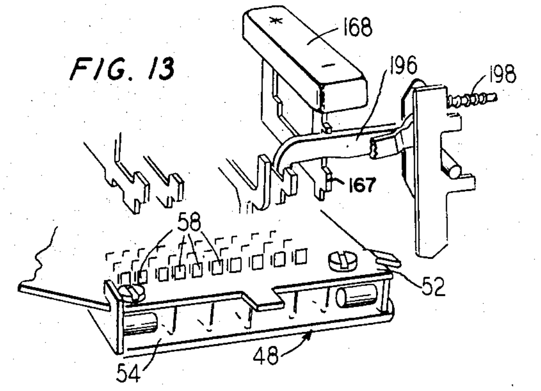
FIG. 13 is a perspective view of the function key escapement mechanism of the machine shown in FIG. 1.
Figure 14:
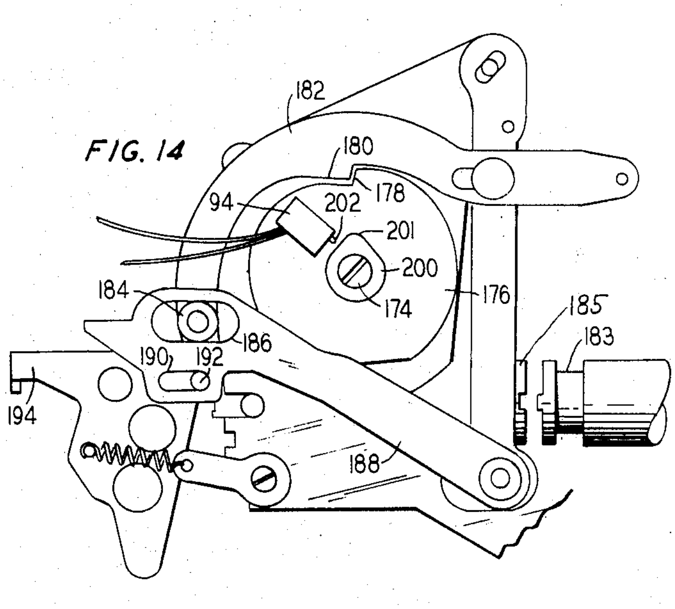
FIG. 14 is a side elevational view of the linkage mechanism controlling the operation of the drive shaft portion of the machine in FIG. 1, during a function cycle.

The pertinent portion of the function cycle mechanism is shown in FIGS. 13 and 14, and includes a drive shaft 174 which mounts a gear 176 having a tooth 178 located in the peripheral wall of the gear. The tooth 178 is adapted to be engaged by a radially inwardly notched surface 180 on an arm 182 which is pivotally mounted to the machine 10. Mounted on the arm 182 is a roller 184 which is received within an elongated slot 186 in a starting arm 188. A second elongated slot 190 is positioned below the slot 186 and slidably receives a pin 192 which is connected to a starting bridge 194.

When the subtract and total key 168 is depressed, a lever 196 (FIG. 13), which is normally biased in a clockwise direction by a spring 198, is caused to move in a counter-clockwise direction. To be more specific, depending from the function key 168 is a link 167 which engages the lever 196 and pivots the lever in a counter-clockwise direction when the key is depressed. This lever 196, by an appropriate linkage mechanism (not shown), causes the arm 182 to pivot in a direction which causes the projection 180 to disengage itself from the tooth 178 on the gear 176. Accordingly, the drive shaft 174 will now be free to rotate. Additionally, the movement of the arm 182 to the disengaged position causes the starting arm 188 and the starting bridge 194 to similarly pivot by reason of their engagement with the arm 182, thereby to energize a motor (not shown) and to connect the motor shaft 183 with a gear 185 which, in turn, is connected to the drive shaft 174. Accordingly, the machine 10 will then perform a subtraction or a totalizing function, as the case may be.

As the gear 176 rotates through a revolution, the arm 182 assumes its normal position so that the projection 180 is again positioned in the path of the tooth 178. As the gear 176 completes its revolution, the tooth 178 will again engage the projection 180 to limit the rotation of the drive shaft 174 to a complete revolution only. Hence, it will be noted that the drive shaft 174 makes one complete revolution each time the machine 10 is actuated to perform one of its functions (i.e., go through a print cycle).

Connected to one terminal of the relay winding **94*d* in the function cycle switch 94 by a lead 95 is a source of potential 97, one terminal of which is connected to ground. The other terminal of the relay winding 94*d* is connected to a contact 99. The contact 99 is engageable by a movable armature 101 which is connected to ground. Accordingly, when the armature 101 is moved into engagement with the contact 99, in the manner described below, a circuit is completed between the source 97 and the relay winding 94*d*** to energize the same.

As shown more particularly in FIG. 14, the function cycle switch 94 is connected to the machine 10 by appropriate means, not shown, and it is positioned adjacent the drive shaft 174. Affixed to the drive shaft 174 is an eccentric cam 200. The high point 201 of the cam 200 is adapted to engage a movable button 202 which projects into the path of movement of the cam 200 as the cam rotates through a revolution. The member 202 is connected to the armature 101 of the function cycle switch 94 and is adapted to move the armature into engagement with the contact 99 as the drive shaft 174 completes a revolution in response to the depression of one of the function keys thereby to energize the relay winding **94*d*** in the manner noted above.

To summarize, therefore, the function cycle switch will be operated from its normal state in which the armature **94*a* is connected to the contact 94*b* to an operated state wherein the armature 94*a* is connected to the contact 94*c* each time the machine 10 performs a function such as add, subtract and the like. Moreover, as noted above, the relay 94 is a so-called time-delay relay. More specifically, the relay winding 94*d* will maintain the armature 94*a* connected to the contact 94*c* for a predetermined interval of time after the relay winding 94*d*** has been deenergized. In practice, the relay has a time delay of 50 milliseconds.

The function cycle recording portion of the present invention includes the contact **94*c* which is connected to an input terminal of the OR gate 104 by a lead 204. Additionally, the lead 204 is connected to junction 206 through an isolation diode 208. The diode is polarized so that the cathode electrode of the diode is connected to the input terminals of the OR gate 104 and the anode electrode of the diode is connected to the junction 206. Normally open coaxial key switches 210*a*–210*c* are individually and selectively operable by the respective key 178, and the correction key 170 to perform in a manner similar to the key switches 114*a*–114*j*. Moreover, the switches 210*a*–210*c* are identical in construction to the switches 114*a*–114*j*** so that when the associated key is depressed the switch will close.

One side of the switches **210*a*–210*c* is connected to the junction 206. The other side of the normally open switches 212*a*–212*c* is connected to the encoder 116. When a pulse appears on any one of the leads 212*a*–212*c* the encoder 116 will be actuated to produce a signal which is indicative of the function key which has been depressed, and therefore produces a record in the recorder 120** of the function performed by the machine.

The operation of the non-add key 172 causes the digits which are mechanically entered in the memory device 46 of the machine 10 prior to a non-add function cycle to be entered on the paper tape without being entered in the memory store of the machine. No electrical coaxial switch is associated with the non-add key 172. However, if a pulse appears on lead 214, the encoder 116 will produce a signal representative of a non-add function of the machine.

More particularly, the lead 214 is connected to the junction 206 through a normally on emitter follower 216. Additionally, the lead 214 is connected to the output terminals of a normally cut-off inverting amplifier 218. Hence the potential on the lead 214 will normally be approximately zero volts. The input terminals of the inverting amplifier 218 are connected to the output terminal of a conventional OR or buffer gate 220, the input terminals of which are connected to the leads **212*a*–212*c* by respective leads 222*a*–222*c***.

The function cycle switch 94 operates in a manner similar to the sampling switch 96. That is, assuming that the totalizing key 16 is depressed, the key switch **210*b* will be closed to connect the lead 212*b* with the junction 206. Additionally, the totalizing function cycle will be initiated in the machine to cause the drive shaft 174 to rotate through a revolution in the manner described above, thereby causing the cam 200 to engage the button 202. Accordingly, the armature 94*a* of function cycle switch 94 will be connected with the contact 94*c*. Thus, the output of the multivibrator 90 will be connected to the input terminals of the pulse shaping network 88 through the lead 204, the OR gate 104 and the lead 108. When this connection is established, the one-shot device or monostable multivibrator 90 will produce a negative-going pulse which will be applied to the lead 212*b* through the isolation diode 208 and the closed switch 210*b* to cause the encoder 116 to produce a signal representative of the totalizing function performed by the machine. Additionally, the appearance of a pulse on the lead 212*b* will cause the output of the inverting amplifier 218 to maintain the lead 214 at zero potential, in the manner noted hereinabove with respect to the amplifier 160**.

On the other hand, if the non-add key 172 is depressed, a function cycle will be initiated thereby causing the one-shot device 90 to apply a negative-going pulse to the junction 206 in the same manner as noted in the preceding paragraph. However, since all of the switches **210*a*–210*c* are open no pulse will be applied to the OR gate 220 and the amplifier 218 will remain in cut-off. Moreover, since the emitter follower 216 is now driven off by the negative pulse, a negative pulse will appear on the lead 214. This signal will cause the encoder to produce a signal representative of the non-add function performed by the machine 10 and to apply the same to the recorder 120**.

At the termination of the function performed by the machine 10, the carriage 48 is returned to its normal or initial position by appropriate means, not shown, wherein the column indicator 20 is aligned with the first indicia 64 on the plate 62 to indicate that the machine is now ready to accept another line of numbers. As the carriage moves back to its normal position in a direction opposite to that indicated by the arrowhead 50 in FIGS. 3 and 4, the operated memory pins 58 are engaged by the inclined surface 82 of the lower plate 80. Thus, the operated pins 58 are caused to move upwardly due to the inclination of the member 82 so that all the memory pins 58 will be restored to their rest position and the machine 10 will be ready to record the next entry. It will be obvious that as the carriage 48 is restored to its normal position the brush 146 will engage those contact fingers **140*a*–140*k* through which the carriage has been stepped. If the output of the multivibrator 90 were connected to the encoder through the lead 158 during this action a plurality of signals would be generated which would represent the introduction of the digit 9 into the the machine 10. However, the occurrence of this error is prevented by the action of the function cycle switch 94. To be more specific, the armature 94a is disconnected from the contact 94b during the time that the carriage 48 is restored to its normal position. Hence, the emitter follower 156 will remain conducting thereby maintaining the lead 158** at zero potential.

In many operations it may be desirable to enter special signals on the magnetic tape in the recorder 120. This may be accomplished by providing auxiliary keys on the keyboard of the machine 10 which operate the auxiliary key switch 98. In the partciular embodiment shown, it will be assumed that two such auxiliary switches are provided.

More particularly, the lead 100 is adapted to be connected to leads 224 and 226 through normally open contacts 98c and 98d, respectively, of the switch 98. Additionally, the lead 224 is connected to an input terminal of the OR gate 104 and the encoder 116. Similarly, the lead 226 is connected to an input terminal of the OR gate 104 and the encoder 116. The contacts 98b and 98d are adapted to be opened and closed, respectively, in response to the operation of one of the auxiliary keys. Likewise, the contacts 98a and 98c are adapted to be opened and closed, respectively, in response to the operation of the other auxiliary key. Assuming that the first auxiliary key is depressed, the contacts 98b will open and the contacts 98d will close, thereby connecting the output terminals of the multivibrator 90 to the input terminals of the pulse shaping network 88 via the lead 226. Accordingly, a pulse will be generated by the multivibrator 90 which will be applied to the encoder via the lead 226. Thus, the encoder will generate a desired signal independently of the operation of the adding machine 10 which will then be applied to the recorder 120.

Accordingly, a recording system for a business machine has been provided in which a character is entered in the recording system only after the machine has been mechanically committed to enter the same character, thereby to insure correspondence between the machine entry and the recorded entry. Additionally, a single-pulse generating means is provided to make the recording system independent of irregular key motion to maintain the correspondence between the recorded and mechanical entries. However, a recording system has been disclosed which is operable to record various functions performed by the machine thereby to produce a complete record of the operation of the machine in a data form presentable to a computer or a similar device.

Figure 15:
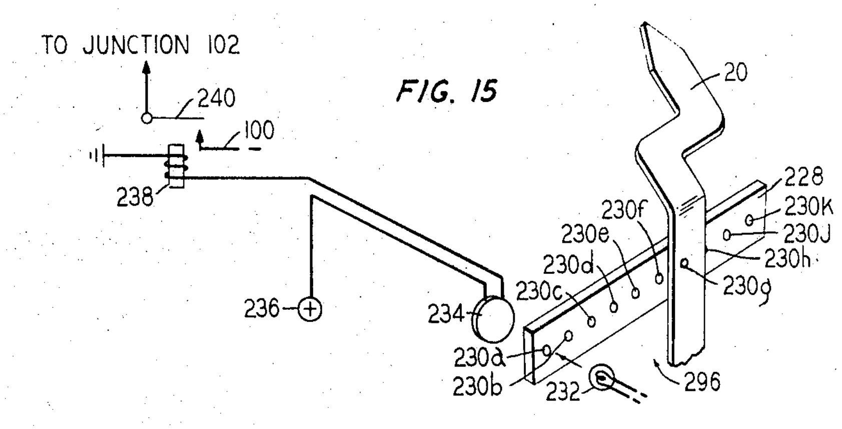
FIG. 15 is a perspective view of a modified embodiment of a sampling switch constructed according to the present invention.

FIG. 15 illustrates a modified embodiment of a sampling switch 296 which utilizes an optical commutator rather than the commutator and brushes described hereinabove and illustrated in FIGS. 2, 10 and 11. The switch 296 includes a longitudinal extending strip 228 which is connected to the movable column indicator 20 by appropriate fastening means, not shown. The strip 228 is provided with longitudinally spaced apertures 230a–230k, corresponding to the number of columns of digits which may be entered in the machine 10. Secured to the machine 10 and positioned on one side of the strip 228 is a lamp 232 which is connected to a source of energy (not shown) so that the lamp 232 will remain illuminated during the operation of the business machine. The lamp 232 is positioned with respect to the apertures 230a–230k so that the light rays from the lamp will sequentially pass through the apertures 230a–230k as the indicator 20 is indexed from column to column. Positioned on the other side of the strip 228 and supported on the machine 10 in any conventional manner, is a photosensitive cell 234. The photocell 234 is serially connected between a source of potential 236 and the winding of a relay 238 having a normally open pair of contacts 240. One of the contacts 240 is connected to the junction 102 and the other contact 240 is connected to the auxiliary switch 98 (FIG. 6) by the lead 100.

The tube 234 is positioned to receive light from the lamp 232 when one of the apertures 230a–230k is aligned with the lamp and the tube thereby to allow current to flow to the relay winding 238 from the source 236. When the relay winding 238 is energized the contacts 240 close thereby to cause a pulse to appear at the junction 110 to cause the character entered in the machine 10 in the manner noted hereinabove, to be similarly entered in the recorder 120.

The apertures 230a–230k are spaced and positioned so that a particular aperture will be aligned with the lamp 232 and the tube 234 thereby to energize the tube 234 when the indicator 20 and hence, the carriage 48, is in the intermediate position. However, when the column indicator 20 is in a column indicating position, the strip 228 which is fabricated from an opaque material, will be interposed between the lamp 232 and the tube 234 to prevent the light rays from reaching the tube. Accordingly the relay winding 238 will be de-energized and the contacts 240 will open.

In the light of the above disclosure it will be obvious that the operation of the optical system shown in FIG. 15 will function in the same manner as the mechanical commutator described hereinabove; that is, it will prevent the recordation of a character until the business machine 10 has been mechanically committed to enter a character.

It will now be obvious that the sampling switches disclosed hereinabove are by way of illustration only and are not to be interpreted as being a limitation on the present invention. In other words, the sampling switch may comprise any device which will connect the output of the multivibrator 90 to the gate 104 and the junction 110 when the carriage 48 moves to the intermediate position. For example, the sampling switch may also take the forms of capacitive, magnetic and similar sensing devices.

While preferred embodiments of the invention have been shown and described herein, it will be obvious that numerous omissions, changes and additions may be made in such embodiments without departing from the spirit and scope of the present invention. For example, the magnetic tape recorder 120 may be replaced by a punch card interface so that the information entered in the machine 10 will be recorded as data in the form of punch cards for later playback into a punch card reader or the like.

What is claimed is:

1. A recording system for recording the operations of a business machine adapted to perform preselected functions on characters entered into said machine, said machine including a plurality of selectively and individually operable character keys respectively representing predetermined characters, a movable carriage, a plurality of spaced columns on said carriage, each one of said plurality of columns comprising individual memory means for selected ones of said plurality of character keys movable from a rest position to an operated position in response to the operation of the associated character key, indexing means responsive to the operation of any one of said plurality of character keys for advancing said carriage one column position, and a plurality of function keys operable to cause said machine to sense the operated memory means and to perform the selected function; said recording system comprising recording means responsive to a pulse for producing signals representative of the operated character and function keys and for recording the signals representing the sequential operation of said plurality of character and function keys, pulse producing means for producing a pulse in response to the movement of said carriage from one column position to the next, and a key switch for each of said selected ones of said character keys and for said function keys responsive to the operation of the respective key for connecting said pulse producing means with said recording means.

2. A recording system as in claim 1, in which said pulse producing means includes a pulse network for producing said pulse and a sampling switch operable in response to the movement of said carriage from one column position to the next to initiate operation of said pulse network and to connect said pulse network with the key switches associated with said plurality of character keys.

3. A recording system as defined in claim 2, in which said pulse producing means further includes switching means for switching said pulse network from said key switches associated with said character keys to said key switches associated with said function keys in response to the operation of any one of said plurality of function keys to apply said pulse to said key switches operable by said function keys.

4. A recording system as in claim 3, in which said switching means includes time delay means for maintaining said pulse network connected to said key switches operable by said function keys for at least a preselected interval of time after said one function key has been operated.

5. A recording system as in claim 2, in which said sampling switch comprises a first contact connected to said carriage and movable therewith, and a plurality of second stationary contacts each positioned to be sequentially engaged by said first contact as said carriage is indexed from one column to the next column to connect said pulse network with said character key switches and to initiate operation of said pulse network.

6. A recording system as in claim 1, in which said pulse producing means comprises a pulse shaper and a serially connected monostable multivibrator, a sampling switch operable to connect the output of said monostable multivibrator to said key switches associated with said character keys and the input of said pulse shaper in response to the movement of said carriage from one column position to the next, whereby said monostable multivibrator produces a pulse when said sampling switch is operated and applies said pulse to the key switches associated with said character keys through said operated sampling switch.

7. A recording system as in claim 1, in which said recording means includes encoding means responsive to said pulse for producing a respective signal indicative of the operated key switch and a recording device for sequentially recording said signals.

8. A recording system for recording the operation of a business machine adapted to enter characters therein and to perform preselected functions on the entered characters, said business machine including N character keys representing N different characters selectively and individually movable from an inoperative to an operated position, biasing means for biasing said keys to the inoperative position, a movable carriage normally residing in a first position, a plurality of spaced columns on said carriage, each one of said plurality of columns comprising individual memory means for $N-1$ of said character keys movable from a rest to an operated position in response to the operation of the associated character key to store a character in each of said columns, indexing means responsive to the movement of a character key to the operated position for advancing said carriage to an intermediate position through a distance less than the spacing between adjacent columns and for advancing said carriage to the next column position, and a plurality of function keys individually and selectively operable to cause said machine to sense the operated memory means and to perform the selected function on the characters stored in said columns; said recording system comprising recording means for producing signals representative of the operated character and function keys and for recording said signals to produce a record of the sequential operation of said character keys and said plurality of the function keys in response to the application of a pulse thereto, pulse producing means responsive to the movement of said carriage to said intermediate position for producing a pulse, and a respective key switch for said $N-1$ character keys responsive to the movement of the respective character key to said operated position for connecting said pulse producing means with said recording means.

9. A recording system as in claim 8, in which said pulse producing means includes a pulse network for producing said pulse and a sampling switch operable in response to the movement of said carriage to said intermediate position to initiate operation of said pulse network and to connect said pulse network with the key switches associated with said plurality of character keys.

10. A recording system as in claim 9, in which said sampling switch comprises an insulating block having a first continuous contact thereon, and a plurality of spaced second contacts, brush means connected to said carriage and movable therewith adapted to engage said first contact and to sequentially engage said plurality of second contacts to connect said first contact with said plurality of second contacts, said second contacts being sized and positioned so that said brush means is connected with respective ones of said second contacts when said carriage is in said intermediate position and said brush means is disconnected therefrom when said carriage is in said column position.

11. A recording system as in claim 9, in which said sampling switch includes a strip of opaque material connected to said carriage and movable therewith, a plurality of apertures in said strip of material in one-to-one correspondence with said plurality of column positions, light means for producing a ray of light on one side of said strip, photosensitive means on the other side of said strip for producing an electrical signal when said light beam impinges thereon, and switch means responsive to the operation of said photosensitive means for connecting said pulse producing network with said plurality of character key switches, said apertures being sized and positioned to transmit light from said light means to said photosensitive means when said carriage is in one of said intermediate positions and for preventing light from reaching said photosensitive means when said carriage is in a column indicating position.

12. A recording system as in claim 9, and a function key switch for preselected ones of said function keys operable in response to the operation of the associated one of said preselected ones of said function keys to an operated position, a function cycle switch connected to said pulse network and being operable in response to the operation of one of said function keys for disconnecting said pulse network from said sampling switch and for connecting said pulse network with a second contact, and lead means for connecting each of said function key switches with said second contact, whereby the operation of a function key closes the function key switch associated with said operated function key and applies the pulse produced by said pulse network to said recording means through said operated function key switch.

13. A recording system as in claim 12, in which said function cycle switch includes time delay means for maintaining said pulse network connected to said second contact for at least a preselected interval of time after the operation of said one function key.

14. A recording system as in claim 13, in which said function cycle switch includes a time delay relay comprising a movable armature connected to said pulse network, a first contact connected to said sampling switch, said second contact, and a relay winding for moving said armature from said first contact to said second contact; said armature normally engaging said first contact; and energizing means responsive to the operation of any one of said function keys for energizing said relay winding, whereby said relay winding maintains said armature connected with said second contact for at least a preselected interval of time after the operation of said one function key.

15. A recording system as in claim 8, in which said pulse network includes a pulse shaper and a serially connected monostable multivibrator, means for connecting the output of said monostable multivibrator to said function cycle switch, means for connecting said second contact to said pulse shaper, whereby the operation of said function cycle switch connects the output of said monostable multivibrator to the input of said pulse shaper to cause said monostable multivibrator to produce a pulse.

16. A recording system as in claim 9, and pulse generating means responsive to the operation of the Nth character key for generating a pulse and for applying the pulse generated thereby to said recording means, and disabling means responsive to the operation of any one of said $N-1$ character key switches for disabling said pulse generating means.

References Cited

UNITED STATES PATENTS

| | | | |
|---|---|---|---|
| 2,856,130 | 10/1958 | Woodward et al. | 235—145 |
| 2,917,233 | 12/1959 | Grady | 235—60.38 |
| 2,931,564 | 4/1960 | Christian et al. | 235—60.13 |
| 2,969,176 | 1/1961 | Anderson | 235—60.18 |
| 3,007,632 | 11/1961 | Dilling et al. | 235—60.12 |
| 3,363,835 | 1/1968 | Mailer | 235—61 |

STEPHEN J. TOMSKY, Primary Examiner

U.S. Cl. X.R.

235—58, 60.47, 60.18